United States Patent [19]
Otsuki et al.

[11] Patent Number: 5,877,804
[45] Date of Patent: Mar. 2, 1999

[54] METHOD AND APPARATUS FOR MOVING OBJECT DETECTION

[75] Inventors: Akira Otsuki, Matsudo; Yun Jong Choi, Tokyo, both of Japan

[73] Assignees: Fujikura Ltd.; FMT Ltd., both of Tokyo, Japan

[21] Appl. No.: 417,686

[22] Filed: Apr. 6, 1995

[30] Foreign Application Priority Data

| Apr. 25, 1994 | [JP] | Japan | 6-109050 |
| Sep. 9, 1994 | [JP] | Japan | 6-216441 |
| Dec. 28, 1994 | [JP] | Japan | 6-328922 |

[51] Int. Cl.$^6$ .............................. H04N 7/18; H04N 9/47
[52] U.S. Cl. .......................................... 348/155; 348/143
[58] Field of Search .................... 348/155, 152, 348/153, 700, 143; 382/294, 276, 107, 254; 386/52; H04N 7/18, 9/47

[56] References Cited

U.S. PATENT DOCUMENTS

| 5,099,324 | 3/1992 | Abe | 558/108 |
| 5,134,472 | 7/1992 | Abe | 348/155 |
| 5,212,547 | 5/1993 | Otsuki | 358/105 |
| 5,548,659 | 8/1996 | Okamoto | 382/107 |

FOREIGN PATENT DOCUMENTS

| 0 465 375 A2 | 1/1992 | European Pat. Off. . |
| 1-166273 | 6/1989 | Japan . |

Primary Examiner—Robert Chevalier
Attorney, Agent, or Firm—Finnegan, Henderson, Farabow, Garrett & Dunner, L.L.P.

[57] ABSTRACT

The present invention provides a method for detecting a moving object and apparatus for the same. The image data [$\Delta_{ij}$ (k)] outputted by subtracter 4 are alternatively contained in image buffers 21 and 22. In subtracter 24, the image data [$\Delta_{ij}$(k-1)] of one timing beforehand is removed from the image data [$\Delta_{ij}$(k)] of the present time point. In addition, the image data [$\Delta_{ij}$(k-1)] of one timing beforehand and the image data [$\Delta_{ij}$(k)] of the present time point are compared using comparator 25. In this case, if image data [$\Delta_{ij}$(k)] and image data [$\Delta_{ij}$(k-1)] differ, the image data [$\Delta_{ij}$(k-1)] of one timing beforehand is supplied to subtracter 26. The initial moving object image is excluded by subtracter 26. Consequently, it is possible to precisely distinguish the shape, size, etc. of a moving object without traces (afterimage) of the moving object at the present time point remaining in the final image data [$\underline{\Delta}_{ij}$ (k)] $_R$. According to another method also proposed in the present invention, the image data [$\Delta_{ij}$(k-1)] of the moving object are obtained by subtracting the image data [$D_{ij}$(k-1)] of one timing beforehand or the average image data [$M_{ij}$(k-1)] of one timing beforehand from the present image data [$D_{ij}$(k)], and the image data [$\Delta_{ij}$(k-2)] of the moving object are obtained by subtracting the image data [$D_{ij}$(k-2)] of two timings beforehand or the average image data [$M_{ij}$(k-2)] of two timings beforehand from the present image data [$D_{ij}$(k)]. The traces (afterimage) of a moving object is erased by obtaining theoretical product of the image data [$\Delta_{ij}$(k-1)] and [$\Delta_{ij}$(k-2)].

10 Claims, 10 Drawing Sheets

METHOD AND APPARATUS FOR MOVING OBJECT DETECTION

BACKGROUND OF THE INVENTION

1. Field of the Invention

The present invention relates to a method for detecting a moving object from an image photographed by a video camera or the like, and apparatus for the same.

2. Relevant Art

In public places where a large and unspecified number of persons enter and leave (e.g., banks, stores, etc.) and/or where dangers are generated by unwanted intrusions (e.g., electric power plants, power transmission facilities, etc.), video cameras are currently installed at predetermined positions, and the generation of abnormal situations is checked by means of viewing the image taken from this video camera. However, with respect to this image viewing model, normally, a person (in charge) must continually watch the monitor screen, and thus this method is rather undesirable from the viewpoint of labor saving. In addition, another method for detecting the generation of abnormal situations can be considered in which the image taken from the video camera is recorded on videotape and viewed afterwards by the person-in-charge using high-speed play. In this case, it is possible to reduce the actual working time of the person in charge; however, this method poses disadvantages in that it is not possible for the person-in-charge to detect an abnormal situation immediately following the generation of this abnormal situation.

In consideration of the aforementioned, a method is proposed in which the image of a moving object, such as an unexpected intruder or the like, is automatically recognized from among the images taken by the video camera. Models of this nature include, for example, a method for detecting a moving object by means of obtaining the deviation whereby the difference between images of each frame is minimized; and a method for detecting a moving object by means of conducting a Fourier transformation of the image at each frame and then detecting the moving object from the ratio of the aforementioned Fourier transformation from the preceding and subsequent frames. However, in these methods, disadvantages exist in that due to the necessity of conducting complex computations at a high precision over an extremely short time period, a system for conducting high-speed processing is necessary, thereby leading to high costs. In addition, other disadvantages exist in that when viewing outdoor scenes in which the background presents a number of complex movements, e.g., the swaying of trees or the like, due to the existence of a large number of objects other than that intended for detection, it is extremely difficult to distinguish the object to be detected from the movements of the aforementioned.

With regard to these drawbacks, a moving object detecting apparatus for detecting the image of a moving object by means of image processing using a comparatively simple computation without performing high-speed processing, has been proposed. For example, the image processing apparatus disclosed in Otsuki, et al., (U.S. Pat. No. 5,212,547: May 1993) averages a plurality of past images to form a standard image, calculates the difference between the color data of each pixel of this standard image (hereinafter referred to as "dot data") and the dot data of the present image corresponding to this aforementioned dot data, and then finally detects this calculated difference as the image of a moving object.

According to this type of apparatus, the detected moving object is statistically recognized by means of forming the aforementioned standard image, and stochastic inference or judgment is then possible with respect to this statistical recognition. In addition, the objective detection of fuzziness is also possible. Furthermore, it is also possible to determine membership function from an objective standpoint, and minimize the influence of noise contained in the image at each instant. This type of apparatus can, moreover, be constructed at a comparatively low cost, and is superior in that precise detection of abnormal phenomena is possible.

However, according to the image processing apparatus disclosed in Otsuki, et al., (U.S. Pat. No. 5,212,547: May 1993), at the time of forming a standard image, in the case where a moving object appears over the majority of a plurality of past images to be averaged, a standard image containing the image of this moving object is inevitably formed. When attempting to detect only the moving object from the image of the present time point using this standard image, the image of only the moving object at the present time point, as well as the image of the moving object contained in the standard image, as an afterimage of the aforementioned moving object, are detected.

In addition, in the formation of the above standard image, when the number of samples of past images, from which an average is to be taken, is small, the aforementioned afterimage appearing in the detection result is particularly remarkable. For example, the appearance of an afterimage in the detection result is maximized in an apparatus for detecting an image of a moving object by means of comparing an image at a time point from a predetermined period of the past and an image at the present time point, without using the aforementioned standard image.

In this manner, when the aforementioned afterimage appears in the detection result, it becomes difficult to distinguish the actual size, shape, etc. of the original moving object to be detected. In addition, in cases where the afterimage is extremely remarkable, it becomes difficult to even specify the moving object itself.

SUMMARY OF THE INVENTION

Therefore, it is an object of the present invention to provide a method for detecting a moving object, and apparatus for the same, in which the afterimage of a moving object can be excluded from the image of this moving object to be detected, thereby preventing misdetection caused by this aforementioned afterimage.

Consequently, the present invention provides a method for detecting a moving object, and apparatus for the same, comprising the steps of:

incorporating image data which is sequentially supplied over a predetermined time interval;

accumulating and averaging image data of a predetermined period of the past;

detecting image data of a moving object within said sequentially supplied image data by means of subtracting said averaged image data from said sequentially supplied image data; and excluding image data corresponding to an afterimage of said moving object by means of subtracting image data of a moving object, detected over a predetermined time period of the past, from said image data of said detected moving object.

According to the aforementioned method for detecting a moving object, and apparatus for the same, the image data of the moving object within the image data of the present time point is detected by means of averaging the image data of a plurality of past images over a predetermined period of the past, and then subtracting this averaged image data from the image data of the present time point. Furthermore, image data of a moving object detected over a predetermined period of the past is subtracted from the image data of the aforementioned moving object. As a result, image data corresponding to an afterimage of this moving object is excluded from the image data of the detected moving object.

Accordingly, it is possible to detect only the image data of the moving object at the present time; thus, in the case when an image appears on a display or the like based on this image data, it is possible to precisely measure the shape, size, etc., of the moving object. In addition, since the initial image occurring at the time when the moving object first appears is excluded (removed), even during the appearance period of the moving object, a present image excluding the aforementioned initial image is obtained, and formation of a standard image proceeds according to the statistical detection theory using this present image. Consequently, other advantages are obtained in that a precise standard image can be formed, and continuous detection of a moving object is possible.

DETAILED DESCRIPTION OF THE EMBODIMENTS

In the following, the embodiments of the present invention will be explained with reference to the Figures.

First Embodiment

A. Theory of the Present Invention

To begin with, the theory of the present invention will be explained.

When defining, by means of the formula below, image data comprising a matrix wherein the rows and columns of image data taken by means of a video camera or the like are expressed by i and j, respectively, $$[R_{ij}(t)] \rightarrow [D_{ij}(t)]$$
$$[L_{ij}(t)]$$
$$[D_{ij}(t)] = \sum_{j=0}^{J} \sum_{i=0}^{I} d_{ij}(t)$$
$$(t = \text{sampling period})$$

the image data of a moving object is statistically expressed by the following.

$$[\Delta_{ij}(t)] = [D_{ij}(t)] - [M_{ij}(t)]$$

Here, $[M_{ij}(t)]$ corresponds to statistical standard data, i.e., standard image S. Consequently, when the statistically authorized level (hereinafter referred to as "threshold value"), is expressed by means of $[Z_{ij}]$, an abnormal situation (a moving object) for detection is expressed by the following.

$$[\Delta_{ij}(t)] \geq [Z_{ij}]$$

In other words, in the image data $[D_{ij}(t)]$, the kth image data following the appearance of a moving object is expressed as $[\Delta_{ij}(k)]$ by substituting $t \rightarrow k$. Here, the moving object is classified by its nature.

The appearance of a moving object is expressed by the following.

$$[\Delta_{i0,j0}], \text{ wherein } k=0$$

In addition, the movement/fluctuation of a moving object on the screen is expressed by the following.

$$[\Delta_{ij}(k)] = [\Delta_{i(k-1),j(k-1)} (k-1)] + [\Delta_{ik,jk} (k)]$$

In the aforementioned, $[\Delta_{i(k-1), j(k-1)} (k-1)]$ represents an imaginal image, and $[\Delta_{ik, jk} (k)]$ represents a real image.

In other words, the image data of the moving or fluctuating object is contained in standard image S, and as a result, the image data indicating an abnormal situation at a given time forms a projected image of the object including an imaginal image (or afterimage) which is an image following the commencement of movement. Consequently, the real image $[\underline{\Delta}_{ij} (k)]$ of a moving object at a given point in time is expressed by the following.

$$[\underline{\Delta}_{ij}(k)] = \frac{1}{n} \sum_{k=0}^{k} \{[\Delta_{ij}(k)] - [\underline{\Delta}_{ij}(k-1)]\}$$

In this manner, the exclusion (removal) of an afterimage is achieved by means of continuing the aforementioned expression.

B. Structure of the Embodiment

In the following, a moving object detecting apparatus according to the first embodiment will be explained with reference to the Figures.

Figure 1:
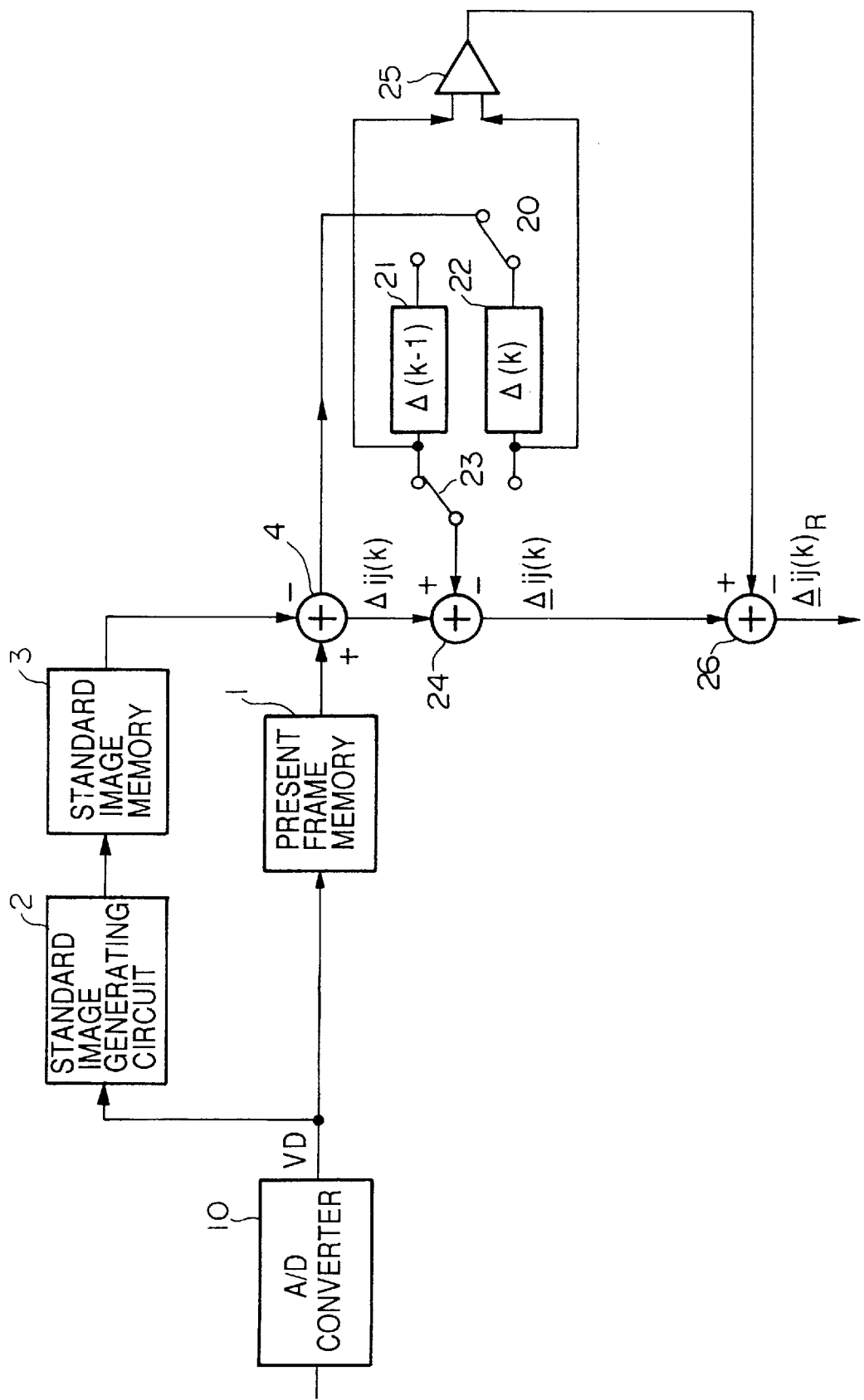
FIG. 1 is a block diagram showing the structure of a moving object detecting apparatus according to a first embodiment of the present invention.

FIG. 1 is a block diagram showing a structure of the aforementioned moving object detecting apparatus. A/D converter 10 converts an analog projection signal outputted from a video camera (not shown in the Figures) into image data of a digital signal, and then outputs this image data to the present frame memory 1 and standard image formation circuit 2. Present frame memory 1 has a capacity for storing data VD of one image plane (one frame); the projected image supplied at each time Δt is sequentially stored in this memory. The image data stored in present frame memory 1 is subsequently supplied to subtracter 4. In addition, standard image formation circuit 2 forms a standard image wherein an n number of image planes of time Δτ(Δτ≧Δt) intervals at the past of time τ are averaged with regard to a random time instant t (to be explained hereinafter). This standard image is an image plane of only stationary objects, i.e., the background in which the projected image information of moving objects has been excluded from the image planes taken by means of the aforementioned video camera. In addition, this standard image serves as the image plane of reference for detecting a moving object. Standard image memory 3 records the standard image outputted from standard image formation circuit 2.

Figure 2:
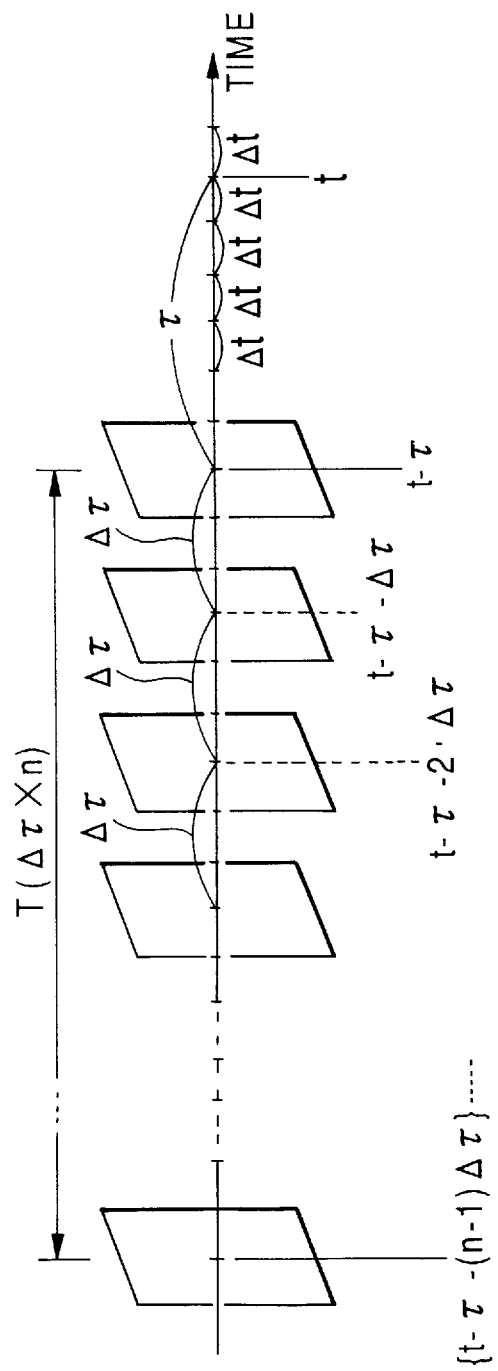
FIG. 2 is a timing chart explaining the formation procedure of a standard image according to the first embodiment.

In the following, the method of forming the standard image by means of standard image formation circuit 2 will be explained using the timing chart shown in FIG. 2. To begin with, the matrix of the image plane at random time instant t is expressed by means of $[D_{ij}(d_{ij},t)]$. In addition, the matrix of desired standard image S is expressed by $[S_{ij}(s_{ij},t)]$. On the other hand, the aforementioned n number of past image planes of time τ portion can be expressed by $[D_{ij}(t-\tau)]$, $[D_{ij}(t-\tau-\Delta\tau)]$, $[Dij (t-\tau-2\cdot\Delta\tau)]$, ..., $[Dij \{t-\tau-(n-1)\Delta\tau)\}]$.

Subsequently, when calculating the average matrix $[D_{ij}(d_{ij})]$ of the above n number of data matrices, the following expression is applied with regard to each dot:

$$[d_{ij}] = \frac{\sum\limits^{n} d_{ij}}{n}$$

The average matrix $[D_{ij}(d_{ij})]$ is characterized in masking objects which have moved during the interval of time (n−1)Δτ. In other words, in the interval of time (n−1) Δτ, if there is no change (fluctuation) during each frame, the aforementioned becomes the averaged value; on the other hand, in the case when a moving object was present, since the position of this moving object changes in each frame, the image of the moving object in the cumulative image plane becomes small. Consequently, the image information of the aforementioned moving object is nearly eliminated by means of averaging the cumulative image plane. In addition, even in case of an instantaneous change (e.g., contrast change, noise, etc.), this change at most effects only a few frames, and is thus masked by means of averaging the aforementioned cumulative image plane. In this manner, the final average matrix $[D_{ij}(d_{ij})]$ comprises only the background image in which the image of an object which moved within the field of view of the video camera has been removed, from at least time instant {t−τ−(n−1)Δτ} to time instant (t−τ).

Therefore, the matrix $[S_{ij}(s_{ij},t)]$ of standard image S is expressed as follows.

$$S_{ij}(s_{ij}, t) = \frac{1}{n} \sum\limits^{n} [D_{ij}\{t - \tau - (n - 1)\Delta t\}]$$

Furthermore, it is also possible to set time τ to "0"; in this case, standard image S is formed based on the past, from time instant t to time instant {t−(n−1)Δτ}.

Figure 3:
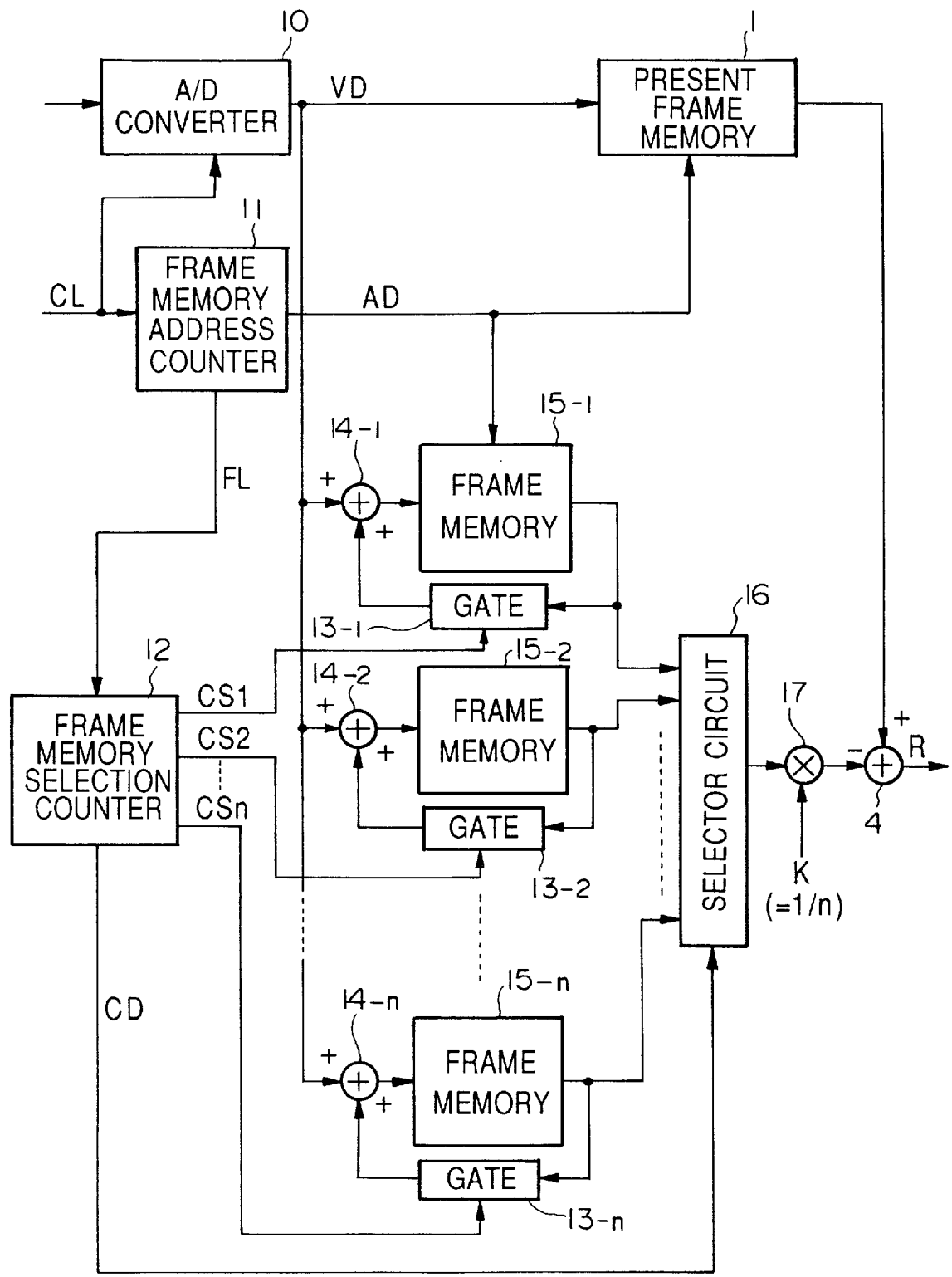
FIG. 3 is a block diagram showing a detailed construction of a standard image-forming unit and standard image memory according to the first embodiment.

In the following, a detailed structural example of standard image formation circuit 2 and the aforementioned standard image memory 3 will be explained with reference to the block diagram shown in FIG. 3. In this Figure, the components which correspond to those of FIG. 1 are expressed using the same numerals. In FIG. 3, A/D converter 10 is provided which converts a projected image signal outputted from a video camera (not shown in the Figures) into a digital signal in accordance with a basic clock signal CL, and then outputs this digital signal as image data to present frame memory 1 and adders 14-1~14-n (n: frame number), which will be explained hereafter. In addition, a frame memory address counter 11 is provided which forms an address signal AD and frame signal FL in accordance with the aforementioned basic clock signal CL, and then outputs the aforementioned to present frame memory 1, frame memory selection counter 12 and frame memories 15-1~15-n (to be explained hereinafter).

Frame memory selection counter 12 outputs select signals CS1~CSn for respectively selecting frame memories 15-1~15-n to which image data is outputted, and control signal CD for selecting which image data recorded in frame memory 15-1~15-n will be outputted in accordance with frame signal FL. Select signals CS1~CSn are respectively supplied to gate circuits 13-1~13-n. In addition, control signal CD is supplied to selector circuit 16. Each of gate circuits 13-1~13-n obtains the logical product of the image data outputted by frame memories 15-1~15-n and select signals CS1~CSn, and outputs the respective result to adders 14-1~14-n, respectively. In other words, gate circuits 13-1~13-n respectively output the image data stored in frame memories 15-1~15-n to adders 14-1~14-n only in the case when select signals CS1~CSn reach a high level.

Adders 14-1~14-n respectively add the image data at each time instant and the image data recorded in frame memories 15-1~15-n, and output the respective sums to the aforementioned frame memories 15-1~15-n. Frame memories 15-1~15-n sequentially store the supplied image data in accordance with address signal AD. In other words, each of frame memories 15-1~15-n is designed such that the image data of a plurality of frames are duplicated (summed) and stored therein, and the image data of each frame memory is spaced at time Δτ. Subsequently, selector circuit 16 selectively outputs the image data stored in one of frame memories 15-1~15-n to multiplier 17 in accordance with control signal CD. After averaging the aforementioned by multiplying the selected image data by a constant K (=1/n), multiplier 17 outputs this result to subtracter 4. The image data at each time instant which is stored in present frame memory 1 is supplied to subtracter 4, and subtracter 4 subtracts the aforementioned selected image data from the above image data at each time instant.

Figure 4:
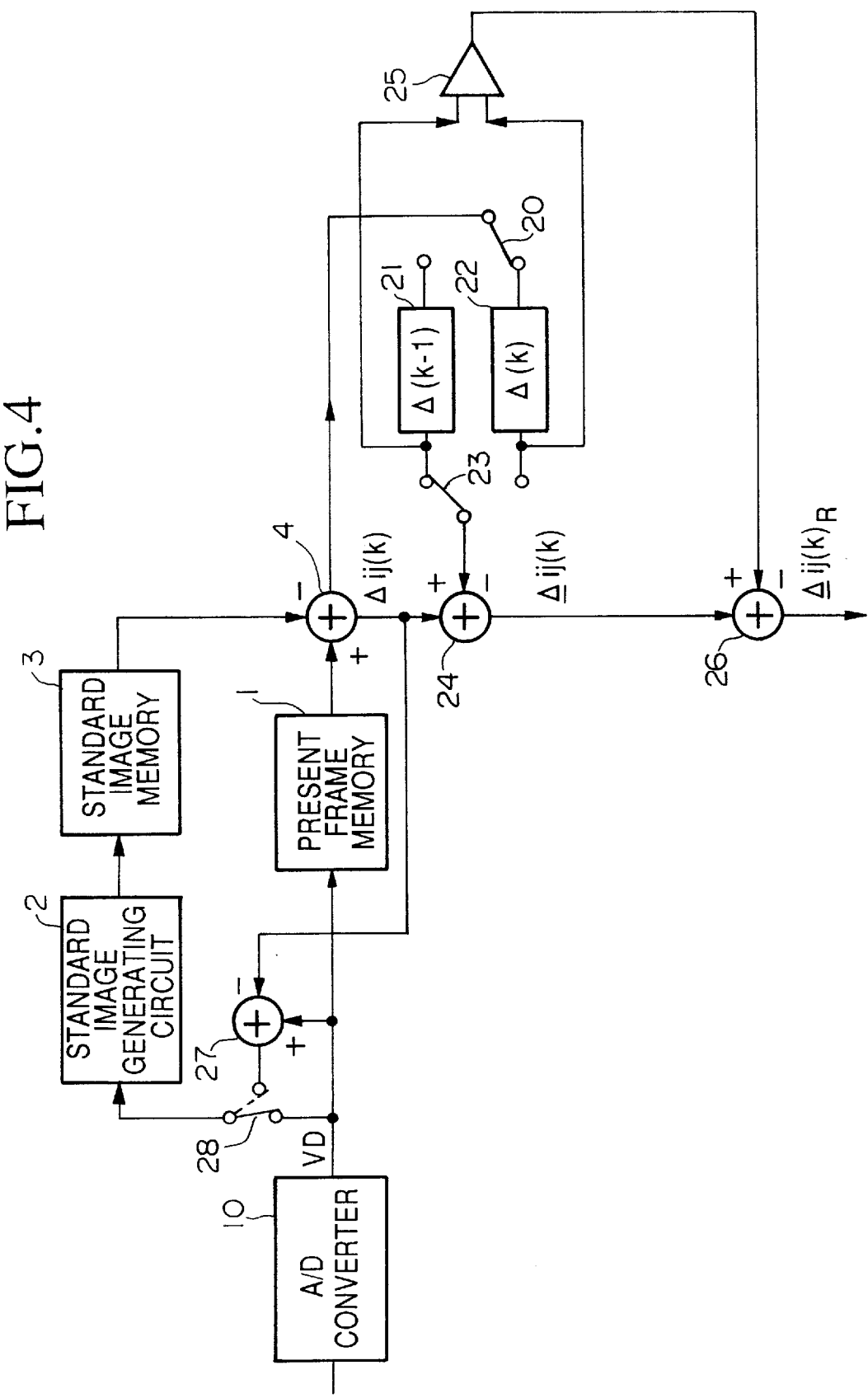
FIG. 4 is a block diagram showing another structure of a moving object detecting apparatus according to the first embodiment.

The output of subtracter 4, i.e., the image data $[\Delta_{ij}(k)]$ of a moving object at the present time point is supplied reciprocally to image buffers 21 and 22 via switch 20, and also supplied to one input terminal of subtracter 24, shown in FIG. 4. Image buffers 21 and 22 comprise memory for recording the image data of one frame. The image data $[\Delta_{ij}(k-1)]$ preceding the present image data by a single timing and the image data $[\Delta_{ij}(k)]$ of the present time point are alternatively contained in these image buffers 21 and 22. Image buffers 21 and 22 supply the image data contained therein to switch 23, and similarly to comparator 25. Switch 23 is designed to normally select the image buffer in which image data $[\Delta_{ij}(k-1)]$ of one timing beforehand is stored, and supplies this image data $[\Delta_{ij}(k-1)]$ of one timing beforehand (i.e., one timing previous to the present time point) to the other input terminal of the subtracter 24.

Subtracter 24 calculates the real image $[\Delta_{ij}(k)]$ of the present time point by means of subtracting the image data $[\Delta_{ij}(k-1)]$ of one timing beforehand from the image data

[$\Delta_{ij}(k)$] of the present time point, and supplies this real image to one input terminal of subtracter 26. Here, the initial afterimage at the time point when the moving object first appeared is contained in the aforementioned real image [$\underline{\Delta}_{ij}(k)$]. Subsequently, comparator 25 compares the image data [$\Delta_{ij}(k-1)$] of one timing beforehand and the image data [$\Delta_{ij}(k)$] of the present time point, and in the case when the image data [$\Delta_{ij}(k)$] of the present time point differs from the aforementioned, i.e., exhibits a change, comparator 25 determines that a moving object has appeared, and supplies the image data [$\Delta_{ij}(k-1)$] of one timing beforehand to the other input terminal of subtracter 26. Subtracter 26 then calculates the image data [$\underline{\Delta}_{ij}(k)$]$_R$ expressing only the moving object by means of subtracting the image data [$\Delta_{ij}(k-1)$] at the time point when the moving object appeared from the aforementioned real image [$\underline{\Delta}_{ij}(k)$], and outputs this image data to a post-circuit (not shown in the Figures).

C. Operation of the Embodiment

In the following, the operation of the aforementioned embodiment will be explained. The formation of standard image S is identical to conventional methods, thus this description will be omitted. Standard image S ([$Z_{ij}$]) outputted from standard image memory 3, and the image data [$D_{ij}(k)$] at time instant t outputted from the present frame memory 1 are respectively supplied to subtracter 4. At this point, time instant t indicates the time point at which the moving object appeared. Accordingly, subtracter 4 calculates the image data [$\Delta_{ij}(k)$] of the moving object by subtracting the standard image data [$Z_{ij}$] from image data [$D_{ij}(t)$]. The aforementioned image data [$\Delta_{ij}(k)$] is, for example, supplied to and stored in image buffer 22 via switch 20. Consequently, at this time point, image data [$\Delta_{ij}(k-1)$] of one timing beforehand is contained in image buffer 21, and this image data [$\Delta_{ij}(k-1)$] is supplied to subtracter 24 via switch 23.

Accordingly, by means of subtracter 24, the real image [$\underline{\Delta}_{ij}(k)$] at the present time point is calculated by means of subtracting the image data [$\Delta_{ij}(k-1)$] of one timing beforehand from the image data [$\Delta_{ij}(k)$] of the present time point. In this case, the image of the moving object is not included in the image data [$\Delta_{ij}(k-1)$] of one timing beforehand; thus, the result of the above calculation of subtracter 24 is the real image [$\underline{\Delta}_{ij}(k)$] of the present time point, i.e., the image data of the moving object. This real image [$\Delta_{ij}(k-1)$] is supplied to subtracter 26.

In the meantime, the image data [$\Delta_{ij}(k-1)$] not including the image of the moving object from one timing beforehand, and the image data [$\Delta_{ij}(k)$] of the present time point are compared by means of comparator 25. In this case, the image of the moving object is contained in the image data [$\Delta_{ij}(k)$] of the present time point. Thus, a judgment is made that the moving object has appeared, and the image data [$\Delta_{ij}(k-1)$] of one time beforehand is supplied to subtracter 26. In subtracter 26, this image data [$\Delta_{ij}(k-1)$] is subtracted from the aforementioned real image [$\underline{\Delta}_{ij}(k)$]. In this case, the image of the moving object is not contained in the image data [$\Delta_{ij}(k-1)$], and thus, the real image [$\underline{\Delta}_{ij}(k)$] is outputted as complete image data [$\underline{\Delta}_{ij}(k)$]$_R$.

Subsequently, at time instant t+1, the initial moving object image at the aforementioned time instant t is contained in the image data [$\Delta_{ij}(k)$] calculated in subtracter 4. This image data [$\Delta_{ij}(k)$] is stored in image buffer 21 via switch 20. Consequently, at this time point, the image data [$\Delta_{ij}(k-1)$] of one timing beforehand, i.e., at time instant t, is stored in image buffer 22. This image data [$\Delta_{ij}(k-1)$] is the image data expressing the initial moving object image.

In subtracter 24, the real image [$\underline{\Delta}_{ij}(k)$] at the present time point is then calculated by means of subtracting the image data [$\Delta_{ij}(k-1)$] of one timing beforehand from the image data [$\Delta_{ij}(k)$] of the present time point. In this case, the image of the moving object at time instant t is included in the image data [$\Delta_{ij}(k-1)$] of one timing beforehand. Thus, the calculation result of subtracter 24 is supplied to subtracter 26 as a real image [$\underline{\Delta}_{ij}(k)$] containing the initial moving object image in which the image data of one timing beforehand has been excluded.

The image data [$\Delta_{ij}(k-1)$] containing the image of the moving object from one timing beforehand and the image data [$\Delta_{ij}(k)$] at the present time point are then compared by means of comparator 25. In this case, if image data [$\Delta_{ij}(k-1)$] and image data [$\Delta_{ij}(k)$] differ, in other words, if an image exists in which the position of a moving object or the like has changed, the image data [$\Delta_{ij}(k-1)$] of one timing beforehand is supplied to subtracter 26. In this manner, this image data ($\Delta_{ij}(k-1)$) serves as the initial moving object image data. Consequently, in subtracter 26, the initial moving object image data, i.e., image data [$\Delta_{ij}(k-1)$], is subtracted from the aforementioned real image [$\underline{\Delta}_{ij}(k)$], and this result is outputted as image data [$\underline{\Delta}_{ij}(k)$]$_R$ (i.e., an image in which the initial moving object image has been excluded).

In the following, as described above, while image data [$\Delta_{ij}(K)$] is being alternatively stored in image buffers 21 and 22, the image data [$\Delta_{ij}(k-1)$] of one timing beforehand is excluded from the image data [$\Delta_{ij}(k)$] of the present time point in subtracter 24, and, at the same time, the initial moving object image is excluded in subtracter 26. Consequently, with regard to the final image data [$\underline{\Delta}_{ij}(k)$]$_R$ at the present time point, the shape, size, etc., of the aforementioned moving object can be precisely distinguished without traces (afterimages) of objects other than the moving object at the present time point.

Furthermore, in the formation process of the standard image by means of the aforementioned standard image formation circuit 2, in the case when both the frame number n added by means of adder 14 and constant K supplied to multiplier 17 are designated as "1", and the image data of a predetermined period of the past is simply outputted without averaging a plurality of images, i.e., even when the appearance of the afterimage reaches an extreme, the aforementioned result of excluding the initial moving object image from the image of the detected moving object according to the present embodiment remains unaffected.

In addition, with regard to the formation process of this standard image, as shown in, for example in FIG. 4, it is possible to remove the image data [$\Delta_{ij}(k)$] of the moving object (including the afterimage) from the image data for forming the standard image by means of supplying the image data [$\Delta_{ij}(k)$] which is the output of subtracter 4 to one terminal (negative terminal) of subtracter 27; subtracting the aforementioned image data [$\Delta_{ij}(k)$] from the image data supplied from the video camera in subtracter 27; and supplying the result of this subtraction to standard image formation circuit 2 via switch 28. During the period in which the moving object appears, switch 28 is switched to the subtracter 27 side. In other words, not only is it possible to exclude the afterimage from the image data of the detected moving object, but also statistical testing in the case of a stationary time series can be executed without fail even during the period when the moving object exists, since image data excluding the image data [$\Delta_{ij}(k)$] of the moving object is supplied to standard image formation circuit 2 during the period in which the moving object appears. Specifically, it is possible to continuously form a standard image based on image data wherein only the image data [$\Delta_{ij}(k)$] of the moving object has been excluded.

Figure 5:
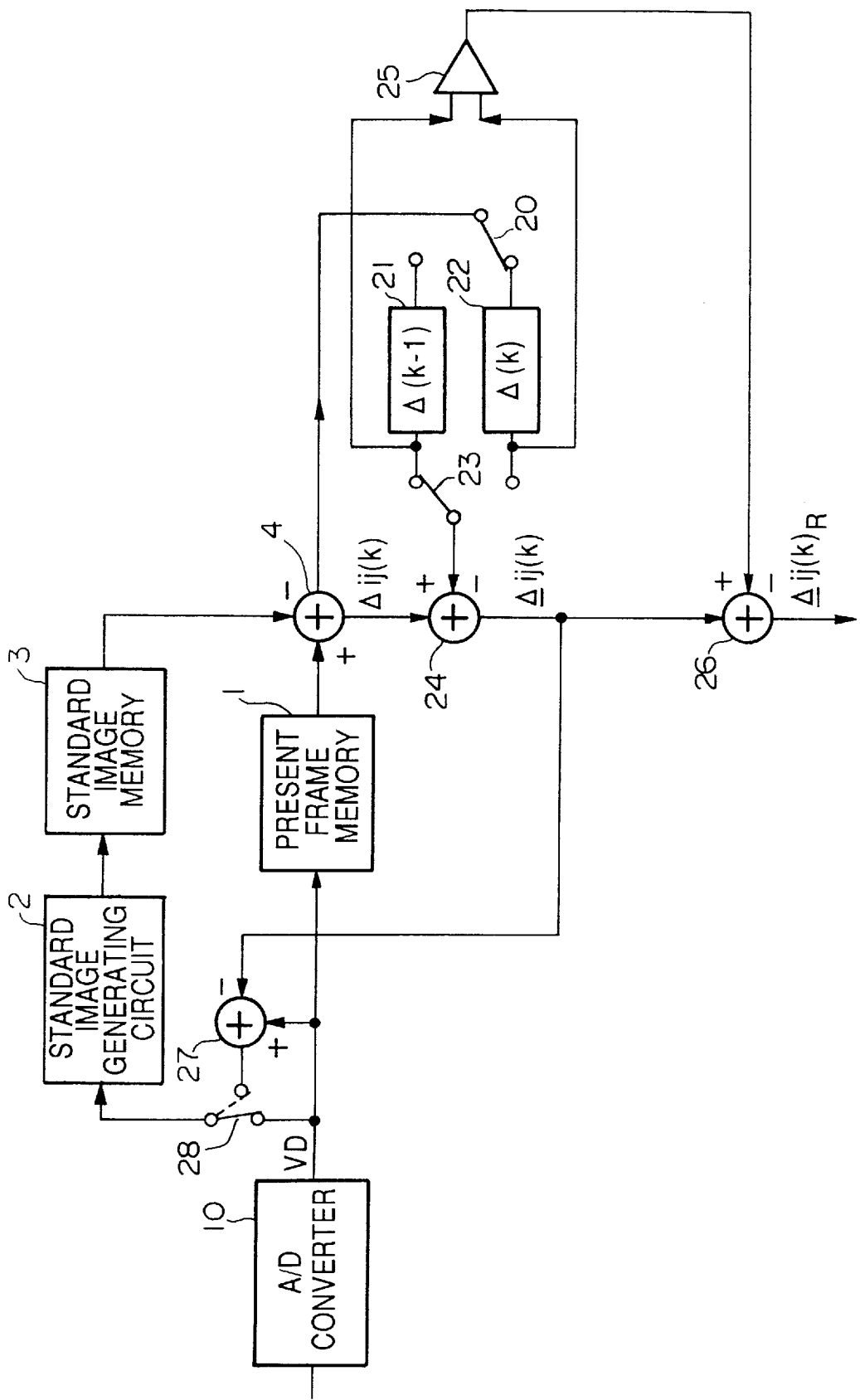
FIG. 5 is a block diagram showing another structure of a moving object detecting apparatus according to the first embodiment.

In addition, as shown in FIG. 5, if the image data [$\underline{\Delta}_{ij}(k)$], i.e., the output of subtracter 24 is supplied to subtracter 27 instead of the output of subtracter 4, i.e., the image data to be supplied to subtracter 27 in FIG. 4, since the afterimage is not contained in this image data [$\Delta_{ij}(k)$], it is possible to remove the initial afterimage during formation of the standard image (the appearance of an object blending into the background at the start of averaging by the apparatus). Switch 28 is switched over to the subtracter 27 side only for the process timing of one frame at the time point when the moving object first appears. Furthermore, in all of the aforementioned operations, it is possible to control the switching of switch 28 by means of a timing for controlling the frame memory or the like with respect to standard image formation circuit 2.

Second Embodiment

Figure 6:
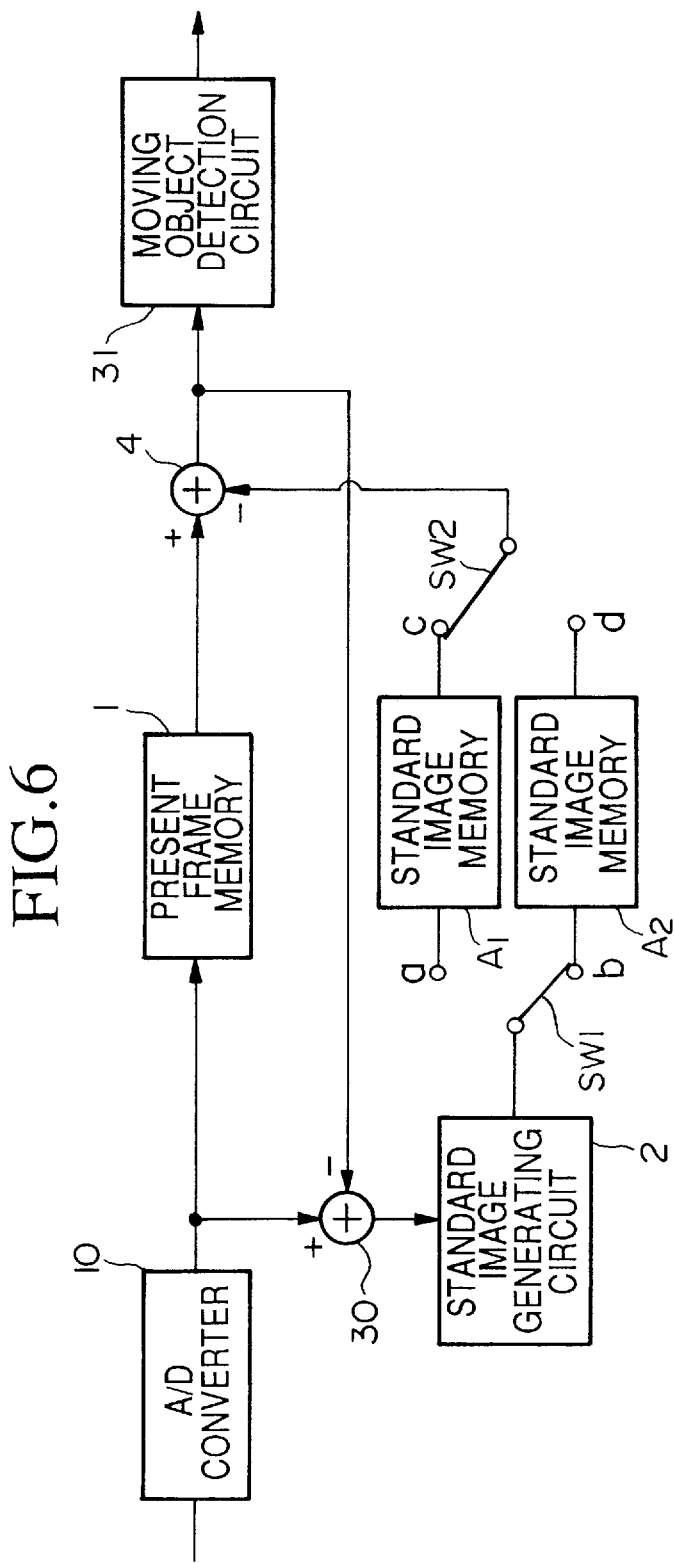
FIG. 6 is a block diagram showing a structure of a moving object detecting apparatus according to a second embodiment of the present invention.

In the following, the second embodiment of the present invention will be explained with reference to FIG. 6. FIG. 6 is a block diagram showing the structure of a moving object detecting apparatus according to the second embodiment of the present invention.

In FIG. 6, A/D converter 10 converts an analog image signal outputted by a video camera (not shown in the Figure) into digital image data, and outputs this to present frame memory 1. Present frame memory 1 possesses the capacity for storing one frame of image data such that when the image data of the subsequent frame is written, present frame memory 1 reads out the synchronized image data of a frame previously stored therein. Subtracter 30 subtracts detection image data (to be explained hereinafter) from the image data outputted by AID converter 10, and outputs this result to standard image formation circuit 2.

Standard image formation circuit 2 forms standard image data in which the image data of n past frames is averaged for the sampling data of each identical dot (pixel) and outputs this standard image data to switch SW1. Here, n is a natural number including 1. Switch SW 1 selectively outputs the standard image data to standard image memory A1 or standard image memory A2. Standard image memories A1 and A2 possess the same structure as present frame memory 1. The standard image data stored in standard image memories A1 and A2 are synchronously read out with present frame memory 1, and selectively outputted to subtracter 4 by means of switch SW2. Subtracter 4 subtracts the standard image data from the image data read out from present frame memory 1, and outputs detection image data obtained from the aforementioned result to subtracter 30 and moving object detecting circuit 31 (explained in the aforementioned). Moving object detecting circuit 31 compares the detection image data with predetermined threshold data and outputs a moving object detection signal.

In the following, the operation of the aforementioned moving object detecting apparatus will be explained.

Standard image data incorporating the average of the image data of the past 1~n frames is recorded in standard image memory A1, while standard image memory A2 remains clear. In addition, the image data of the nth frame is stored (assumed) in present frame memory 1. In the aforementioned situation, switches SW1 and SW2 are respectively connected to the terminal b side and terminal c side of the standard image memories A1 and A2, as shown in the FIG. 6. In this state, when the sampling data of each dot of the subsequent (n+1) frame is sequentially outputted from A/D converter 10, each sampling data is stored once in present frame memory 1, and at the same time, the image data of the nth frame is read out at the sampling data of each dot from the same present frame memory 1 and supplied to subtracter 4. In other words, when a certain sampling data is outputted from A/D converter 10, the aforementioned sampling data of the n+1 frame is written into the present frame memory 1 in accordance with the timing of the first half of the aforementioned output timing, and the sampling data of the nth frame is read out from memory 2 in accordance with the timing of the second half of the above output timing.

At this time, an identical readout address as that in present frame memory 1 is supplied to standard image memory A1, and as a result, the standard image data in standard image memory A1 is successively read out at each dot and supplied to subtracter 4 via switch SW2. Furthermore, in this case, sampling data read out from present frame memory 1 at the same timing, and the standard image data read out from standard image memory A1 respectively represent data relating to the same display dot.

Subtracter 4 subtracts the standard image data from the sampling data outputted from present frame memory 1, and outputs the result of this subtraction to both moving object detecting circuit 31 and subtracter 30. When the output of subtracter 4 exceeds a fixed value, moving object detecting circuit 31 outputs a moving object detection signal. In the case when the image of the nth frame is more-or-less the same as the images of the past 1~n frames, the output of subtracter 4 becomes "0", or an extremely small value; it is also not possible for a moving object detection signal to be outputted from moving object detecting circuit 31. However, in the case when the image of the nth frame is drastically different than the images of the past 1~n frames, the output of subtracter 4 exceeds a predetermined value, and a moving object detection signal is outputted from moving object detecting circuit 31.

With regard to the sampling data outputted from A/D converter 10, the output of subtracter 4 is subtracted in subtracter 30, and the result of this subtraction is supplied to standard image formation circuit 2. Standard image formation circuit 2 then rewrites standard image memory A2 based on the output of subtracter 30.

More concretely, in the second half of each sampling data output timing of A/D converter 10, the difference between the sampling data outputted from A/D converter 10 and the corresponding standard image data within standard image memory A1 at this time point is outputted from subtracter 4. Hence, at a given time point in the second half of a sampling data output timing, if the standard image data is A, and the output of A/D converter 10 is A+X, the output of subtracter 4 becomes X, and the output of subtracter 30 becomes A. In other words, the output of subtracter 30 is the standard image data in which the change X is excluded from the sampling data.

At each output of the sampling data from A/D converter 10, standard image formation circuit 2 reads the aforementioned standard image data in the second half of the timing, and then subsequently reads out data within the corresponding standard image memory A2, sums the aforementioned data, divides the result of this formation by the average number of cycles up until that point, and then again writes this result into the corresponding storage position within standard image memory A2. At the time of output of the sampling data of the (n+1)th frame, the data within standard image memory A2 is "0", and the average number of cycles is "1", hence, the output of subtracter 30 is written into standard image memory A2 in its original form.

Subsequently, the same procedure is repeated at each sequential readout of the sampling data of (n+2)th frame, (n+3)th frame, . . . , from A/D converter 10. When all sampling data of 2nth frame is read out from A/D converter 10, the average value of the sampling data of the past n frames (data minus the moving object portion) is written into standard image memory A2. At this time point, switch SW1 switches from the terminal b side to the terminal a side, and switch SW2 switches from the terminal c side to the terminal d side, and standard image memory Al is cleared. The data within standard image memory A2 is then supplied to subtracter 4 as standard image data, and new standard image data is then formed in standard image memory Al.

Furthermore, in the formation process of the standard image by means of the aforementioned standard image formation circuit 2, by means of subtracter 30, the image data of the moving object from the sampling data, in other words, the image data in which change X is excluded, is supplied to standard image formation circuit 2 as the sampling data. Thus, even in the case when both the frame number n added by means of adder 14 and constant K supplied to multiplier 17 in standard image formation circuit 2 are designated as "1", and the image data of a predetermined period of the past is simply outputted without averaging a plurality of images, the result of excluding the initial moving object image from the image of the detected moving object remains unaffected as in the first embodiment.

Third Embodiment

Figure 7:
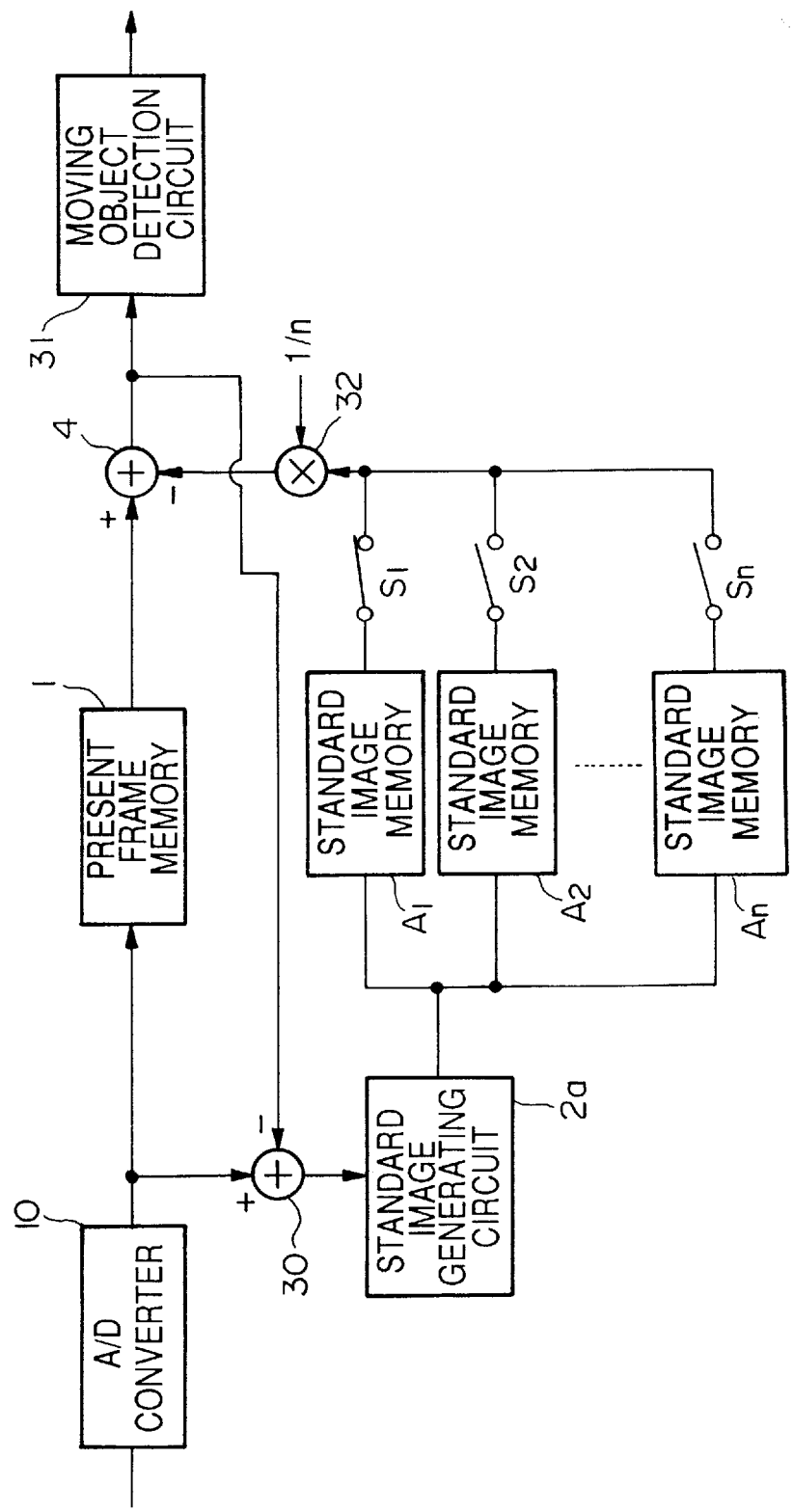
FIG. 7 is a block diagram showing a structure of a moving object detecting apparatus according to a third embodiment of the present invention.

In the following, the third embodiment of the present invention will be explained with reference to FIG. 7. FIG. 7 is a block diagram showing the structure of the third embodiment. In this Figure, components corresponding to those shown in FIG. 6 will be denoted by the same numeral and their explanations will be omitted. The largest points of difference between the embodiment shown in FIG. 7 and that of FIG. 6 reside in the provision of an n number of standard image memories A1~An, and the process for forming the standard image.

In the following, the process for forming the standard image will be explained. When the sampling data of the first frame is outputted from A/D converter 10, standard image formation circuit 2a reads the output of subtracter 30 in the second half of this timing, writes this result into standard image memory A1, and adds it to the image data of the corresponding dots of standard image memories A2~An. Subsequently, at the time when the sampling data of the second frame is read out from A/D converter 10, the output of subtracter 30 in the second half of the aforementioned timing is read, written into standard image memory A2, and added to the corresponding data of standard image memories A1~An (excluding A2). This same process is subsequently repeated hereafter.

In the following, the data change (at the completion of each frame) within standard image memories A1~An from the above-mentioned process are shown below in the case in which n=3. Furthermore, D1, D2, etc. represent the data of the first frame, second frame, etc.

| A1:D1 | D1 + D2 | D1 + D2 + D3 | D4 | D4 + D5 | D4 + D5 + D6 | D7 |
|---|---|---|---|---|---|---|
| A2:D1 | D2 | D2 + D3 | D2 + D3 + D4 | D5 | D5 + D6 | D5 + D6 + D7 |
| A3:D1 | D1 + D2 | D3 | D3 + D4 | D3 + D4 + D5 | D6 | D6 + D7 |

In addition, in the (n+1)th frame, switch S1 is closed and switches S2~Sn are opened by means of standard image formation circuit 2a. Identical readout addresses are provided in standard image memories A1~An as in present frame memory 1, and as a result, in the (n+1)th frame, the data within standard image memory A1 is sequentially read out and outputted to multiplier 32. The data supplied to multiplier 32 is then multiplied by 1/n therein, and outputted to subtracter 4. At this point, in the (n+1)th frame, the sum of the image data of frames 1~n is stored in standard image memory A1. The sum of these data is then multiplied by 1/n and supplied to subtracter 4 as the standard image data. Furthermore, immediately following readout, the data within standard image memory A1 is rewritten by means of the sampling data of the (n+1)th frame.

Subsequently, in the (n+2)th frame, standard image formation circuit 2a closes switch S2 and opens switches S1~Sn (excluding S2). In this manner, in the (n+2)th frame, the data within standard image memory A2 is multiplied by 1/n and supplied to subtracter 4 as standard image data.

Furthermore, the matrix of the image data to be inputted is expressed by $[D_{ij}(t)]$ wherein i and j are the coordinates of the image data, and t represents time. In addition, the matrix of the image data formed by performing an averaging process on this aforementioned image data is expressed by $[M_{ij}(t)]$. The matrix of the image data of a moving object is expressed from the aforementioned matrices of the image data by means of the following.

$$[\Delta_{ij}(\delta_{ij},t)]=[D_{ij}(t)]-[M_{ij}(t)]$$

Consequently, the kth image following appearance of the moving object is expressed by the following.

$$\delta_{ij}(t)=\{m_{i(k-1),\,j(k-1)}(k-1)-d_{i(k-1),\,j(k-1)}(k-1)\}-\{d_{ikjk}(k)-m_{ik,jk}(k)\}$$

In other words, the matrix of the image of a moving object can be expressed by following.

$$[\Delta_{ij}(t)]=[-\Delta_{i(k-1),\,j(k-1)}(k-1)]\cup[\Delta_{ik,jk}(k)]$$

wherein, $[\Delta_{ik,jk}(k)]$ represents a part of the real image, $-\Delta_{i(k-1),\,j(k-1)}(k-1)$ represents an imaginal image or an afterimage, and $$\sum_{k=0}^{k}[\Delta_{ij}(k)]$$

represents the present real image.

Consequently, if $[\underline{\Delta}_{ij}(k)]$ represents the real image at the present time point, then $$[\underline{\Delta}_{ij}(k)] = \sum_{k=0}^{k}\{[\Delta_{ij}(k)]-[\underline{\Delta}_{ij}(k-1)]\}.$$

Furthermore, according to the third embodiment, in the formation process of the standard image by means of standard image formation circuit 2, a standard image is formed based on the result obtained upon subtracting the standard image data from the image data at the present time point, and the subtraction result from the image data of the present time point. Therefore, for example, even in the case where both the frame number n added by means of adder 14 and constant K supplied to multiplier 17 are designated as "1", and the image data of a predetermined period of the past is simply outputted without averaging a plurality of images, the result of excluding the initial moving object image from the image of the detected moving object remains unaffected as in the first and second embodiments.

Fourth Embodiment

Figure 8:
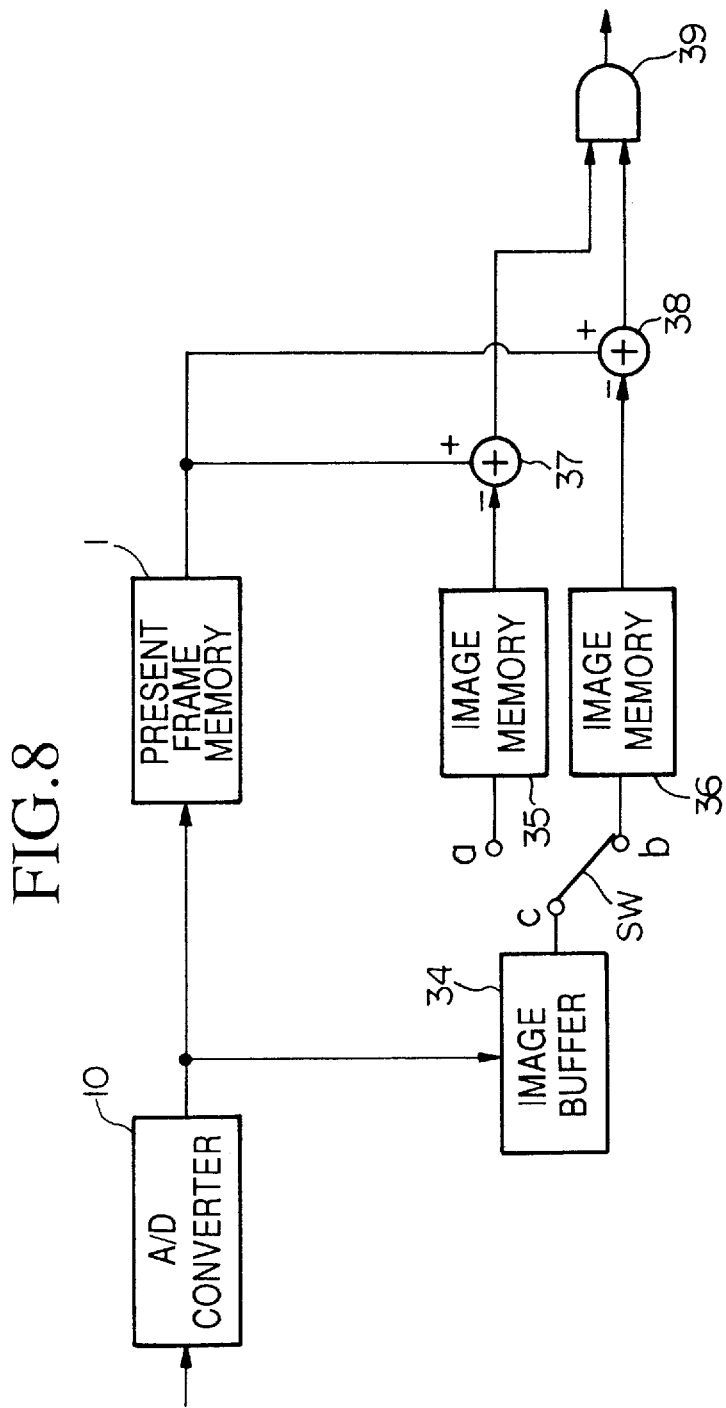
FIG. 8 is a block diagram showing a structure of a moving object detecting apparatus according to a fourth embodiment of the present invention.

FIG. 8 is a block diagram showing the structure of a moving object detecting apparatus according to the fourth embodiment of the present invention. In this Figure, A/D converter 10 converts an analog image signal outputted from a video camera (not shown in the Figure) into digital image data and outputs this result. In present frame memory 1, possessing a storage capacity of one frame of image data, the image data outputted from A/D converter 10 is sequentially written, and this written image data is sequentially read out in the subsequent frame timing. In other words, for example, in FIG. 10, image 52 represents the image data read out from present frame memory 1 at the timing of time instant t2~time instant t3; and image 53 represents the image data read out at time instant t3~time instant t4. In this case, the image data of the image 52 is written into present frame memory 1 at time instant t1~time instant t2, while the image data of the image of 53 is written into present frame memory 1 at time instant t2~time instant t3.

In addition, in the same manner as with present frame memory 1, the image data outputted from A/D converter 10 is sequentially written into image buffer memory 34, and written image data is sequentially read out in the subsequent frame timing. In addition, switch SW and image memories 35 and 36 are also provided. These memories are identical to present frame memory 1. Normally, identical write addresses and readout addresses are respectively supplied to the aforementioned present frame memory 1, image buffer memory 34, and image memories 35 and 36. Also provided in the Figures are subtracters 37 and 38, and AND gate 39.

Figure 10:
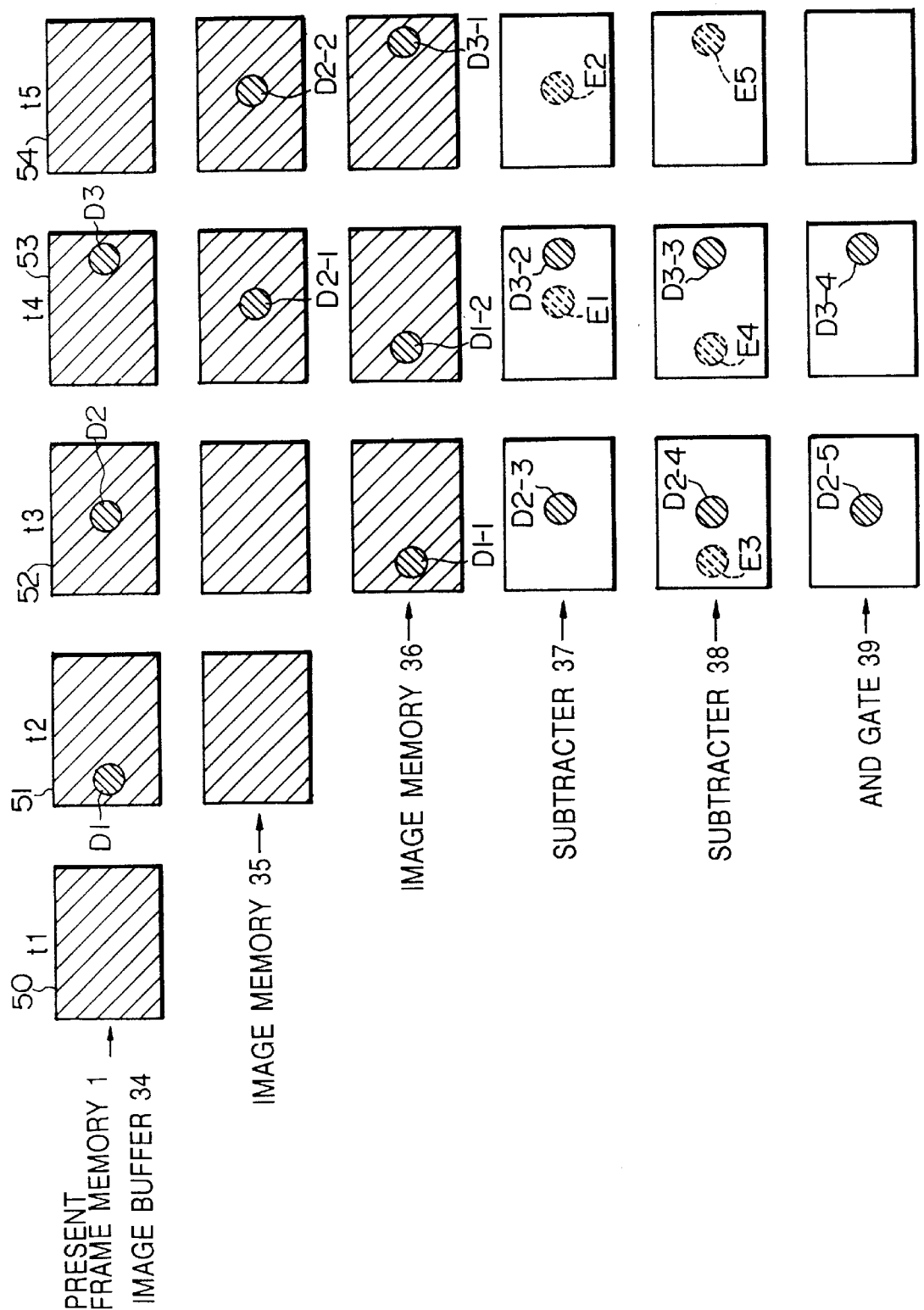
FIG. 10 is a diagram for explaining the operation of the moving object detecting apparatus according to the fourth embodiment.

In the following, the operation of the aforementioned circuit will be explained with reference to FIG. 10. FIG. 10 shows image data outputted from each portion of the circuit. If the image data shown in an image 50 of the same Figure is written into present frame memory 1 and image buffer memory 34 at time instant to, this same image data will be outputted from present frame memory 1 and image buffer memory 34 at the subsequent time instant t0~time instant t1. In addition, if common terminal c of switch SW and terminal a are connected at time instant t0, the data shown in the image 50 is written into image memory 35 at time instant t0~time instant t1. The written image data is then read out from image memory 35 at the subsequent time instant t1~time instant t2 (see FIG. 10). Thereafter, switch SW is alternatively switched at time instant t1, time instant t2, time instant t3, etc.

Subsequently, when the image data shown in FIG. 10 are respectively outputted from present frame memory 1 and image buffer memory 34 at time instant t1~time instant t2, time instant t2~time instant t3, etc., the image data outputted from image memories 35 and 36 are as shown in FIG. 10. Here, D1~D3 represent images of the moving object. In addition, D1-1 and D1-2 are images identical to image D1 of the moving object; D2-1 and D2-2 are images identical to image D2 of the moving object; and D3-1 is an image identical to image D3 of the moving object. As a result, the outputs of subtracters 37 and 38 and AND gate 39 are as respectively shown in FIG. 10. Similarly, D2-3~D2-5 are images identical to images D2 of the moving object; and D3-2~D3-4 are images identical to images D3 of the moving object. In addition, E1 and E2 represent, respectively, afterimages based on images D2-1 and D2-2 within image memory 35; E3 and E4 represent, respectively, afterimages based on images D1-1 and D1-2 within image memory 36; and E5 represents an afterimage based on image D3-1 within image memory 36.

As shown in the aforementioned Figure, at time instant t2~time instant t3, the output of image memory 35 is subtracted from the output of present frame memory 1 in subtracter 37. As a result, only image D2-3 of the moving object based on image D2 of the moving object is outputted from subtracter 37. In addition, in subtracter 38, the output of image memory 36 is subtracted from the output of present frame memory 1, and as a result, image D2-4 of the moving object based on image D2 of the moving object, and afterimage E3 based on image D1-1 are outputted from subtracter 38. The logical product of the outputs of subtracters 37 and 38 is calculated by means of AND gate 39, and as a result, only image D2-5 of the moving object is outputted from the same AND gate 39. The operations at time instant t3~time instant t4 and time instant t4~time instant t5 are identical to the aforementioned operation.

As is clear from the above-described operation, the circuit shown in FIG. 8 uses the image of the previous frame and the image two frames prior to the present image as standard images for image detection of the moving object. The image of the previous frame and the image from two frames beforehand are respectively subtracted from the present image, and by calculating the logical product of these subtraction results, the afterimage based on the image of the object remaining in image memories 35 and 36 is eliminated, and only the image of the moving object existing in the present image is extracted.

In the following, the reason why a precise image of the moving object can be obtained from the aforementioned AND gate 39 will be explained using mathematical expressions. To begin with, the general case in which an averaged image is used will be considered. Currently, if the present image data of the kth frame (here, k is an integer of at least 1) is $D_{ij}(k)$, and the averaged image data of the (k−1)th and (k−2)th frames, in which n past frames have been averaged, are $M_{ij}(k-1)$ and $M_{ij}(k-2)$, respectively, then the change $\Delta_{ij}(k-1)$ and $\Delta_{ij}(k-2)$ in the present image data with respect to each averaged image data of the (k−1l)th and (k−2)th frames can be expressed by the following formulae. In the formulae, i and j are variables expressing coordinates within the image.

$$\Delta_{ij}(k-1)=D_{ij}(k)-M_{ij}(k-1)$$

$$\Delta_{ij}(k-2)=D_{ij}(k)-M_{ij}(k-2)$$

Here, when the sampling coefficient n=1, in other words, according to the present embodiment, in the case when the image data stored respectively in image memories 35 and 36 are similar, if the present image data of the kth frame (here, k is an integer of at least 1) is $D_{ij}(k)$, and the image data of the (k−1)th and (k−2)th frames are $D_{ij}(k-1)$ and $D_{ij}(k-2)$, respectively, then the change $\Delta_{ij}(k-1)$ and $\Delta_{ij}(k-2)$ in the present image data with respect to the image data of the (k−1)th and (k−2)th frames can be expressed by the following formulae. In the formulae, i and j are variables expressing coordinates within the image.

$$\Delta_{ij}(k-1)=D_{ij}(k)-D_{ij}(k-1)$$

$$\Delta_{ij}(k-2)=D_{ij}(k)-D_{ij}(k-2)$$

The aforementioned two formulae conform to the subtraction processes performed by means of subtracters 37 and 38. By means of the following formula, the afterimage components existing respectively in image data $D_{ij}(k-1)$ and $D_{ij}(k-2)$ are excluded, and as a result, it is possible to obtain a real image $R_{ij}(k)$, representing the change of the present image data.

$$R_{ij}(k)=\Delta_{ij}(k-1) \cap \Delta_{ij}(k-2)$$

The above formula conforms to the process performed by means of AND gate 39. Consequently, the moving object detection signal outputted from AND gate 39 is normally a precise signal (real image).

Fifth Embodiment

Figure 9:
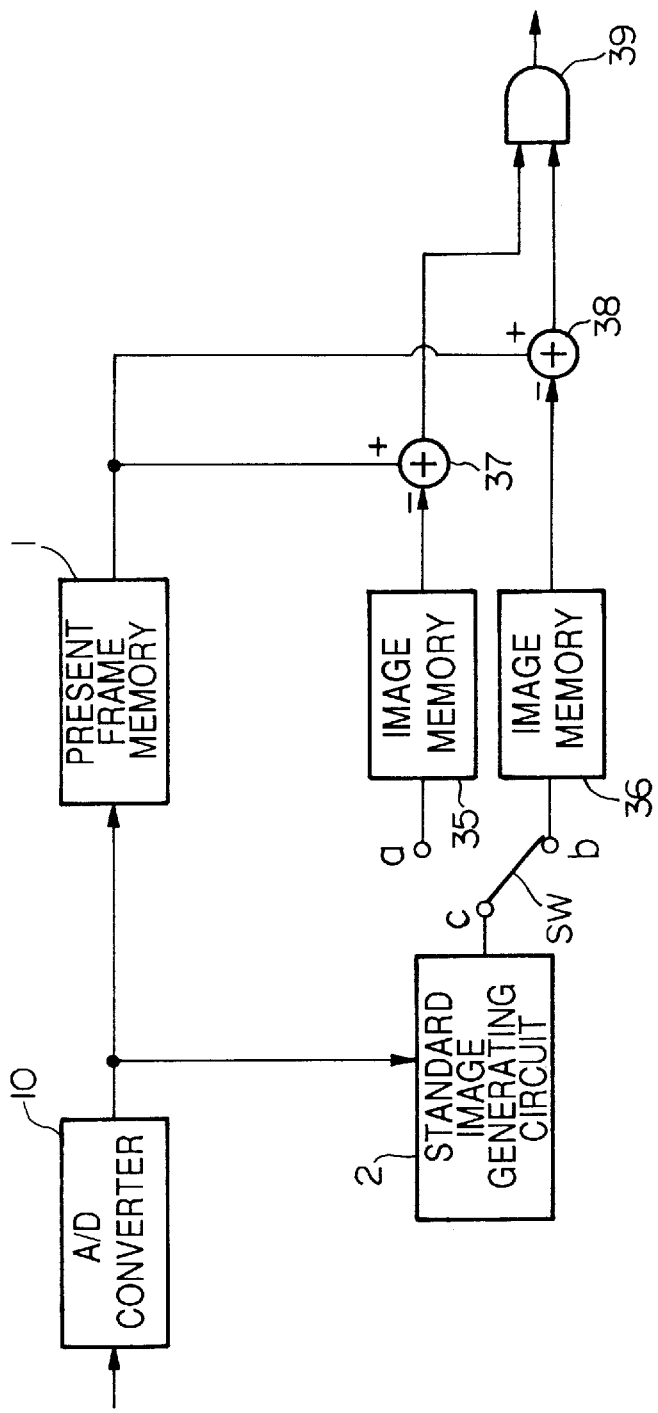
FIG. 9 is a block diagram showing a structure of a moving object detecting apparatus according to a fifth embodiment of the present invention.

In the following, the fifth embodiment of the present invention will be explained with reference to FIG. 9. FIG. 9 is a block diagram showing a structural outline of a moving object detecting apparatus according to the present invention. In this Figure, components corresponding to those shown in FIG. 8 will be denoted by the same numeral and their explanations will be omitted. The main difference between the moving object detecting apparatus shown in this Figure and that illustrated in FIG. 8 is that a standard image formation circuit 2 is provided instead of image buffer 34. This standard image formation circuit 2 forms an average image of n frames and writes this image into image memories 35 and 36. In other words, this standard image formation circuit 2 sequentially accumulates image data outputted from A/D converter 10 at each display dot, and then calculates an average of the image data by dividing by n the cumulative result above at the time when portion corresponding to n frames has been accumulated. Subsequently, this calculated average image data is written into image memory 35. Thereafter, the image data corresponding to n frames is again accumulated, and the average image data therein is formed and similarly written into image memory 36. This process is subsequently repeated hereafter. Furthermore, the readout addresses of image memories 35 and 36 are identical to the readout address of present frame memory 1.

According to this structure, a standard image is formed by means of averaging, and thus the problem of the standard image changing during normal times due to minute swaying or flickering of the image can be solved.

Furthermore, it is possible to store the average image of the past 1~n frames in image memory 35 as a standard image, and also store the average image of the past 2~(n+1) frames in image memory 6.

What is claimed is:

1. Method for detecting a moving object comprising the steps of:

incorporating image data which is sequentially supplied over a predetermined time interval;

accumulating and averaging image data of a predetermined period of the past;

detecting image data of a moving object within said sequentially supplied image data by means of subtracting said averaged image data from said sequentially supplied image data; and excluding image data corresponding to an afterimage of said moving object by means of subtracting image data of a moving object detected over a predetermined time period of the past from said image data of said detected moving object.

2. Method for detecting a moving object comprising the steps of:

incorporating image data which is sequentially supplied over a predetermined time interval;

accumulating and averaging image data of a predetermined period of the past;

excluding image data corresponding to an afterimage of a moving object at the time of averaging; and detecting image data of said moving object by means of subtracting said averaged image data in which image data corresponding to said afterimage of said moving object has been excluded from said sequentially supplied image data.

3. A moving object detecting apparatus, comprising:

standard image forming means for incorporating image data which is sequentially supplied over a predetermined time interval, for accumulating and averaging image data of a predetermined period of the past, and for sequentially outputting said accumulated and averaged image data as standard image data;

first subtracting means for detecting image data of a moving object by subtracting said standard image data from said sequentially supplied image data;

storing means for storing image data of a moving object of a predetermined previous time period from among image data of a moving object detected by said first subtracting means; and second subtracting means for subtracting said image data of said moving object of said predetermined previous time period stored by said storing means from said image data of a moving object detected by said first subtracting means.

4. The moving object detecting apparatus according to claim 3, further comprising:

comparing means for comparing said image data of said moving object of said predetermined previous time period and image data of a moving object at a present time point, and for outputting said image data of said moving object of said predetermined previous time period when image data of said moving object is detected by said comparison; and initial moving object excluding means for subtracting image data outputted by said comparing means from image data outputted by said second subtracting means.

5. A moving object detecting apparatus, comprising:

standard image forming means for incorporating image data which is sequentially supplied over a predetermined time interval, for accumulating and averaging image data of a predetermined period of the past, and for sequentially outputting said accumulated and averaged image data as standard image data;

storing means for storing standard image data of a moving object of a predetermined previous time period from among standard image data sequentially outputted by said standard image forming means;

first subtracting means for subtracting said standard image data stored in said storing means from said sequentially supplied image data and for outputting image data; and second subtracting means for subtracting said image data outputted by said first subtracting means from said standard image data sequentially supplied to said standard image forming means.

6. A moving object detecting apparatus for detecting image data of a moving object by subtracting reference image data based on image data of the past from image data of the present, said moving object detecting apparatus comprising:

first and second storing means for respectively storing reference image data, which is image data of the past, based on an image deviating by a fixed amount of time;

first subtracting means for subtracting reference image data stored in said first storing means from said present image data and for outputting a first output;

second subtracting means for subtracting reference image data stored in said second storing means from said present image data and for outputting a second output; and logical product circuit means for obtaining a logical product of the first and second outputs.

7. The moving object detecting apparatus according to claim 6, wherein said first and second storing means alternatively store reference image data of one cycle previous to a present cycle and reference image data of two cycles previous to said present cycle.

8. The moving object detecting apparatus according to claim 6, wherein said first and second storing means alternatively store standard image data based on image data of 1 to n frames previous to a present frame and standard image data based on image data of n+1 to 2n frames previous to said present frame.

9. A method for detecting a moving object, comprising the steps of:

incorporating image data which is sequentially supplied over a predetermined time interval;

accumulating and averaging image data of a first predetermined period of the past;

detecting image data of said moving object within said sequentially supplied image data by subtracting said averaged image data from said sequentially supplied image data; and excluding image data corresponding to an afterimage of said moving object by subtracting image data of a moving object detected over a second predetermined period of the past from said detected image data of said moving object.

10. A method for detecting a moving object, comprising the steps of:

incorporating image data which is sequentially supplied over a predetermined time interval;

accumulating and averaging image data of a predetermined period of the past;

excluding image data corresponding to an afterimage of said moving object at the time of averaging; and detecting image data of said moving object by subtracting said averaged image data, in which image data corresponding to said afterimage of said moving object has been excluded, from said sequentially supplied image data.

* * * * *